United States Patent [19]

Küchel

[11] Patent Number: 4,872,755
[45] Date of Patent: Oct. 10, 1989

[54] INTERFEROMETER FOR MEASURING OPTICAL PHASE DIFFERENCES

[75] Inventor: Michael Küchel, Oberkochen, Fed. Rep. of Germany

[73] Assignee: Carl-Zeiss-Stiftung, Heidenheim/Brenz, Fed. Rep. of Germany

[21] Appl. No.: 164,790

[22] Filed: Mar. 7, 1988

[30] Foreign Application Priority Data

Mar. 7, 1987 [DE] Fed. Rep. of Germany ....... 3707331

[51] Int. Cl.$^4$ .............................................. G01B 9/02
[52] U.S. Cl. .................................................... 356/360
[58] Field of Search ............... 356/345, 346, 358, 360, 356/363

[56] References Cited

U.S. PATENT DOCUMENTS 4,360,271 11/1982 Downs et al. .
4,596,466 6/1986 Ulrich ................................. 356/345

OTHER PUBLICATIONS

"Direct Measurement of Phase in a Spherical-Wave Fizeau Interferomenter" by R. C. Moore and F. H. Slaymaker, (Applied Optics, vol. 19, No. 13, 7-1-1980, pp. 2196 to 2200.
"Instantaneous Phase Measuring Interferometry" by R. Smythe and R. Moore, (Optical Engineering, Jul.-Aug. 1984, vol. 23, No. 4, pp. 361 to 364).

Primary Examiner—Vincent P. McGraw
Assistant Examiner—S. A. Turner
Attorney, Agent, or Firm—Walter Ottesen

[57] ABSTRACT

For generating several interferograms which differ from each other in the relative phase position between the interfering partial beams, a light source is utilized having a coherence length less than the optical path difference between the two component beams in the measuring path of the interferometer. Furthermore, at least one optical delay device is provided which splits the beam into two component beams and which generates an optical path difference between these component beams which is approximately the same as the optical path difference of the partial beams in the measuring path of the interferometer. Thereafter, the delay device again unites the component beams congruently.

16 Claims, 9 Drawing Sheets

INTERFEROMETER FOR MEASURING OPTICAL PHASE DIFFERENCES

FIELD OF THE INVENTION

The invention relates to an interferometer for measuring optical phase differences which occur between two partial beams in a measuring part. The interferometer includes a light source for providing coherent beams and at least one spatially-resolving receiver.

BACKGROUND OF THE INVENTION

The term "two partial beams in a measuring part" refers to the beam path actually utilized. Further beams can occur because of the multiple reflections. These further beams are, however, not essential and produce at most disturbance effects. The term "coherent radiation" is here utilized in the conventional sense for radiation having a coherence length which is suitable for generating interferences.

Interferometers for measuring optical phase differences are utilized, for example, for the quantitative testing of optical surfaces in that the test surface and the reference surface are imaged onto a spatially-resolving receiver with an interference pattern occurring. For each point of the interference pattern, a sinusoidal intensity variation occurs when the reference surface is moved in the direction of the impinging beam by a half wavelength. These intensity curves can, for example, be stored in a computer as a function of the movement of the reference surface and the best possible adaptation of a sinusoidal curve is determined for every point of the interference pattern or of the test surface. The phase position of each individual sine curve then directly provides the form deviation (with respect to the reference surface) of the corresponding point of the test surface when the wavelength of the light source used is considered.

The paper entitled "Direct Measurement of Phase in a Spherical-Wave Fizeau Interferometer" by R. C. Moore and F. H. Slaymaker (Applied Optics, Volume 19, No. 13, July 1, 1980, pages 2196 to 2200) shows that it is known to use such interferometers not only for the optical testing of plain surfaces, but also for spherical surfaces. In this connection, the Fizeau arrangement is ever more preferred in lieu of the conventional Twyman-Green arrangement because of the simpler configuration. In the Fizeau arrangement, the test and reference surfaces are not disposed in separated interferometer arms; instead, they are disposed in the same interferometer arm wherein they are separated from each other mostly by a wedge-shaped air gap. With the Fizeau arrangement, the interferometer configuration becomes considerably simpler and only the reference surface must be produced with a high optical precision.

In the known arrangements, the reference surface must, for example, be moved by half or a few wavelengths with high position resolution and precisely along a straight line in order to change the phase differences between the reference and test surfaces. For this purpose, piezoelectric transducers are conventional. This method is very complex for large test surfaces which require correspondingly large reference surfaces and, from a certain size on, is no longer realizable. Furthermore, for spherical reference surfaces, the generated phase difference is dependent upon the aperture angle of the corresponding beam, that is, the phase difference is not the same for all points of the interferogram.

The paper entitled "Instantaneous Phase Measuring Interferometry" by R. Smythe and R. Moore (Optical Engineering, July–August 1984, Volume 23, No. 4, pages 361 to 364), discloses a Michelson Interferometer for measuring optical phase differences. In this interferometer, no temporal variation of the relative phase positions between the reference wave and test wave occurs; instead, several interferograms are measured simultaneously with several spatially-resolving receivers. These interferograms differ in a defined manner in the relative phase position between the reference wave and the test wave. For this purpose, the light in both component arms of the Michelson Interferometer is polarize differently for "marking" the phase. The "signal decoder" utilizes this "marking" of test wave and reference wave in order to generate several interferograms (usually three or four) by means of further polarization-active components. These interferograms are distinguished one from another in a defined manner in the relative phase position between the test wave and the reference wave. However, this method is not applicable to a Fizeau Interferometer because no method is known for the latter by means of which the reference beam and the test beam can be polarized differently.

SUMMARY OF THE INVENTION

Accordingly, it is an object of the invention to provide an arrangement which does not have the limitations discussed above and nonetheless can influence the reference beam in a different way from the test beam so that several interferograms are produced, one after the other in a time sequence, or spatially one next to the other. The interferograms differ one from the other in a defined manner in the relative phase position between the interfering component beams.

The interferometer according to the invention measures the optical phase differences which occur between two partial beams in a measuring part. The interferometer includes a light source for providing a beam of coherent radiation and at least one spatially-resolving receiver. According to a feature of the interferometer according to the invention, the coherence length of the light source is less than the optical path difference between the two partial beams in the measuring part. Also, at least one optical delay device is provided which splits up the beam into two component beams and generates an optical path difference between these component beams which is approximately equal to the optical path difference of the partial beams in the measuring part of the interferometer. An optical delay device brings the component beams returning from the measuring part together again in a congruent manner.

In a preferred embodiment of the invention, the optical path difference of the delay device is changeable in a reproducible manner by a fraction of a wavelength of the light source. The optical components of the delay device can be held small independently of the size of the reference and test surfaces so that even for very large reference and test surfaces, the known adjusting arrangements for a reproducible change of the optical path difference can be applied by means of the invention.

In another preferred embodiment of the invention, several spatially-resolving receivers are provided for making simultaneous measurements of several interferograms having different phase positions. For this purpose, polarizing optical means are provided by means of which the component beams having experienced different delays in the delay device, are polarized differently. The invention therefore makes it possible to exploit the advantages of a simultaneous measurement of several interferograms with fixed phase relationships to each other without polarizing optical means being required in the measuring part of the interferometer. In this way, the advantages of the high insensitivity with respect to shock and vibrations, or the measurement of fast-changing events can be applied to numerous interferometer types.

In a further preferred embodiment of the invention, at least two optical delay devices are provided with several spatially-resolving receivers. The delay devices are adjusted or are adjustable to fixed phase differences with respect to each other. Thus, even with fewer than three optical delay devices, optical means for generating beam paths with further phase differences are present. Therefore, the invention makes it possible to exploit the advantages of a simultaneous measurement of several interferograms with fixed phase relationships to each other without requiring polarizing optical means in the entire interferometer. In this way, the advantages of high insensitivity with respect to shock and vibrations or the measurement of fast-changing events can also be applied to interferometers wherein polarization would be a disturbance.

BRIEF DESCRIPTION OF THE DRAWINGS

The invention will now be described with reference to the drawings wherein:

FIGS. 8 and 8a is a lateral-shear interferometer having four spatially-resolving receivers; and, FIG. 9 is a Mach-Zehnder arrangement.

DESCRIPTION OF THE PREFERRED EMBODIMENTS OF THE INVENTION

Figure 1:
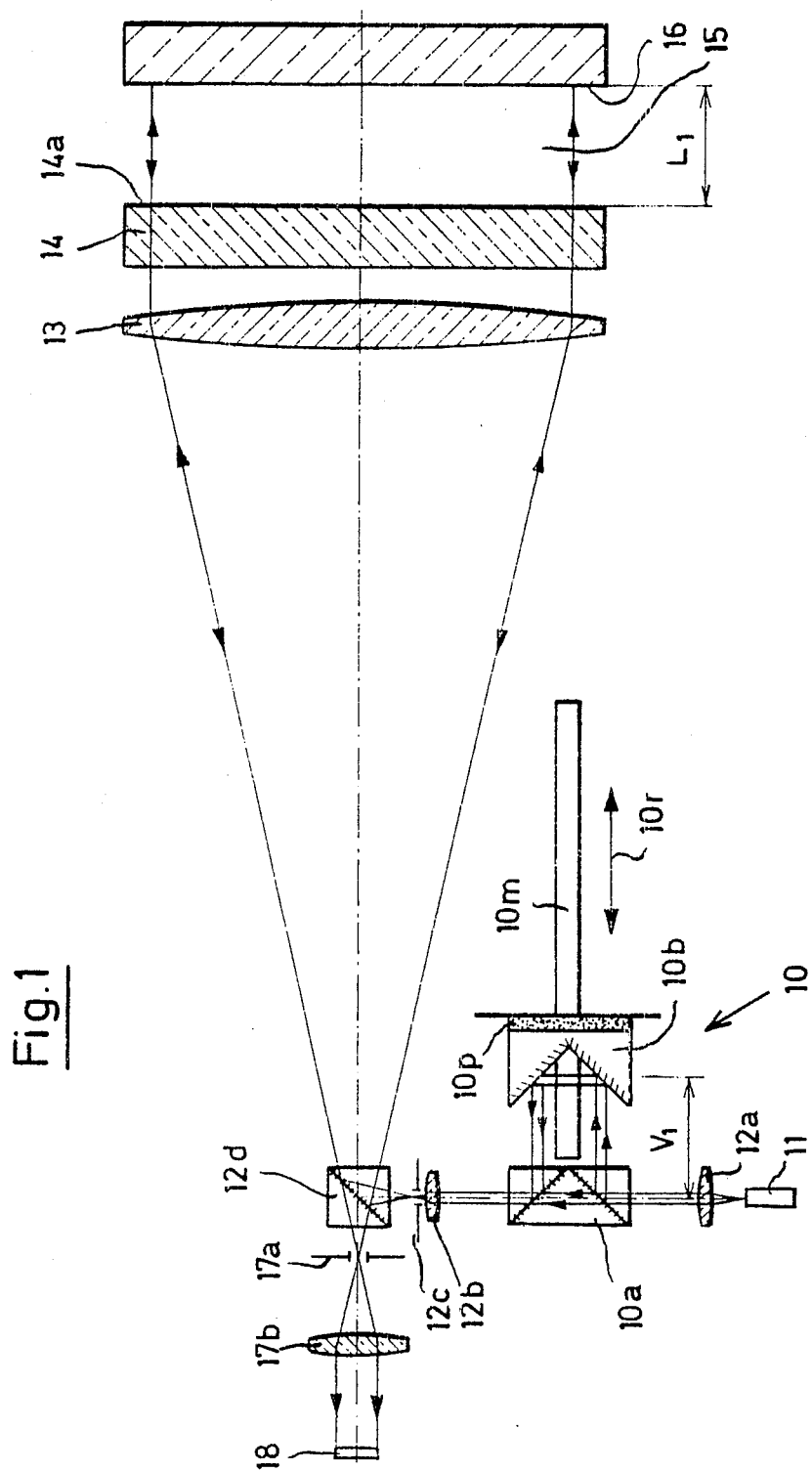
FIG. 1 is a schematic showing a Fizeau arrangement.

The schematic of FIG. 1 shows an interferometer which corresponds to the known Fizeau arrangement except for the delay device 10. The light source 11 can, for example, be a semiconductor laser. The beam emanating from light source 11 is provided with an appropriate aperture angle by means of the lenses (12a, 12b) and the diaphragm 12c and is reflected at the beam splitter cube 12d and is again made parallel by lens 13. The parallel beam then passes through the planar plate 14 having the reference surface 14a from which a part (partial beam) of the beam is reflected. The other part of the beam passes through the air gap 15 having the optical path length $nL_1$ and a further part (partial beam) is reflected at the test surface 16. The two reflected partial beams then pass through the lens 13, the beam splitter cube 12d, a diaphragm 17a and a lens 17b up to the spatially-resolving receiver 18. As a consequence of the foregoing, the test surface 16 and the reference surface 14a are imaged on the receiver 18 by means of the lenses (13 and 17b) with an interference pattern occurring at the receiver. The interference pattern can, for example, be evaluated in a known manner as described in the introduction.

The delay device 10 is important for the invention and includes a beam splitter cube 10a as well as a 90°-angle mirror 10b which can be coarsely adjusted in the directions 10r on a mechanical guide 10m and can be finely adjusted with a piezo element 10p. Those rays which pass over the angle mirror 10b have an optical path difference of $2nV_l$ relative to the remaining rays wherein:

n is the index of refraction of air; and, $2V_1$ is the additional path length through the delay path.

The rays emanating from the light source 11 can reach the receiver 18 along four different optical paths OP:

$OP_1$ without path difference $2nV_1$, without air gap $2nL_1$ $OP_2$ with path difference $2nV_1$, without air gap $2nL_1$ $OP_3$ without path difference $2nV_1$, with air gap $2nL$ $OP_4$ with path difference $2nV_1$, with air gap $2nL_1$ The 90°-angle mirror is so positioned on the mechanical guide 10m that for the difference of the optical path $OP_2$ and $OP_3$, the following applies:

$$|OP_2 - OP_3| << KL$$

wherein KL is the coherence length of the radiation of the light source 11. However, for all other possible differences of the optical path lengths, the following applies:

$$|OP_1 - OP_2| >> KL$$

$$|OP_1 - OP_3| >> KL$$

$$|OP_1 - OP_4| >> KL$$

$$|OP_2 - OP_4| >> KL$$

$$|OP_3 - OP_4| >> KL$$

The condition can be realized that the interference pattern on the receiver 18 can only arise by means of an interference between the component beams with optical paths $OP_2$ and $OP_3$ by suitably selecting the following: the coherence length of the light source 11, the length $L_1$ of the air gap 15 and the length $V_1$ of the delay device 10. The other component beams do not contribute to the interference pattern; instead, they simply effect a reduction in contrast which, however, can be accepted because of the photoelectric measurement of the irradiated intensity and the way in which the subsequent evaluation is made. A recording of at least three interferograms is achieved with the known method described in the introduction with the piezo element 10p being utilized for changing the phase differences.

Figure 2:
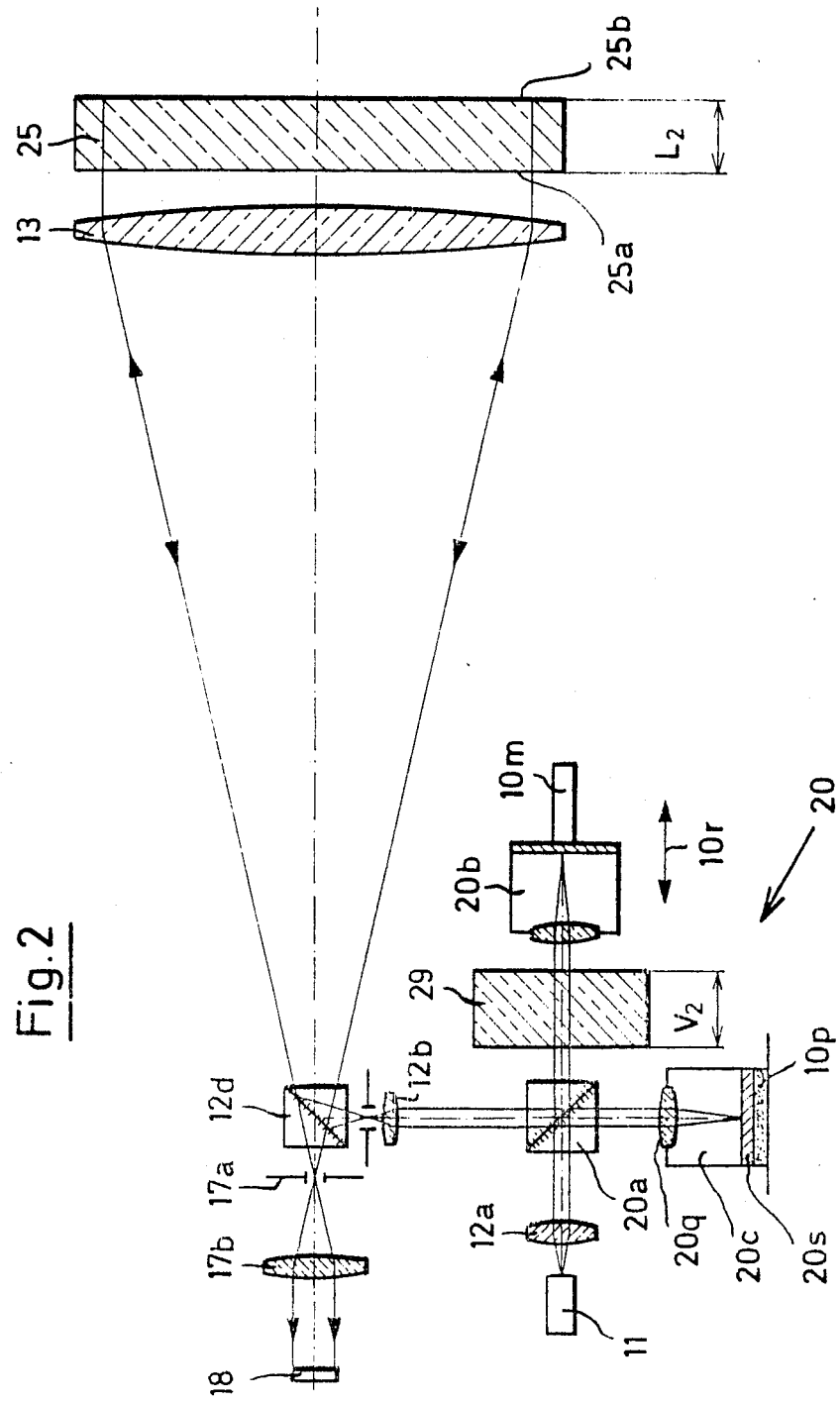
FIG. 2 is an arrangement which is similar to the Fizeau arrangement and is equipped with a plane plate.

FIG. 2 shows an arrangement which is similar to a Fizeau arrangement. An advantage of the invention is that the distance between the test surface and the reference surface does not change. Therefore, planar plates can be tested with respect to their planar parallelism. With the arrangement of FIG. 2, the optical phase differences are measured between the surfaces 25a and 25b of the planar plate 25 which for this purpose is mounted downstream of the positive lens 13. The optical delay device 20 in this case is an especially advantageous embodiment which includes a beam splitter cube 20a and two retroreflecting devices (20b, 20c). The retroreflective devices (20b, 20c) are each made up of a converging lens 20q and a mirror 20s disposed in the focal plane of the converging lens and have the characteristic that they reflect into themselves the parallel rays impinging thereupon independently of the angle of incidence. The retroreflective arrangement 20b is coarsely adjustable on the mechanical guide 10m and the reflecting arrangement 20c is finely adjustable with a piezo electric transducer 10p. A planar plate 29 is mounted in the beam path ahead of the retroreflecting device 20b, effecting a delay of $2nV_2$ wherein n is the index of refraction of the planar plate 29. The planar plate 29 should be made from the same type of glass and be of the same thickness as the planar plate 25 to be tested so that the interference pattern on the receiver 18 can be as rich in contrast as possible.

Maintaining these requirements for the planar plate 29 is, however, not at all critical. It is even possible to do without the planar plate 29, and to utilize the delay device 10 of FIG. 1, because when the radiation of the light source 11 has, for example, a spectral half-value width of approximately 0.1 nm and a corresponding coherence length of approximately 4 mm, a reduced contrast of the interference pattern is obtained without the plate 29, which nevertheless can still be tolerated. It is understood that in this case, care must be taken that the optical path difference between the two beam paths of the delay device (in FIG. 1 this path difference is $2nV_1$) is equal to twice the optical path length of the planar plate 25, i.e. $2nL_2$.

In the embodiment of FIG. 2, the radiation emanating from the light source can reach the receiver via four different optical paths. For a suitable selection of the coherence length and the remaining conditions, the requirements listed above with respect to FIG. 1 apply correspondingly.

Figure 3:
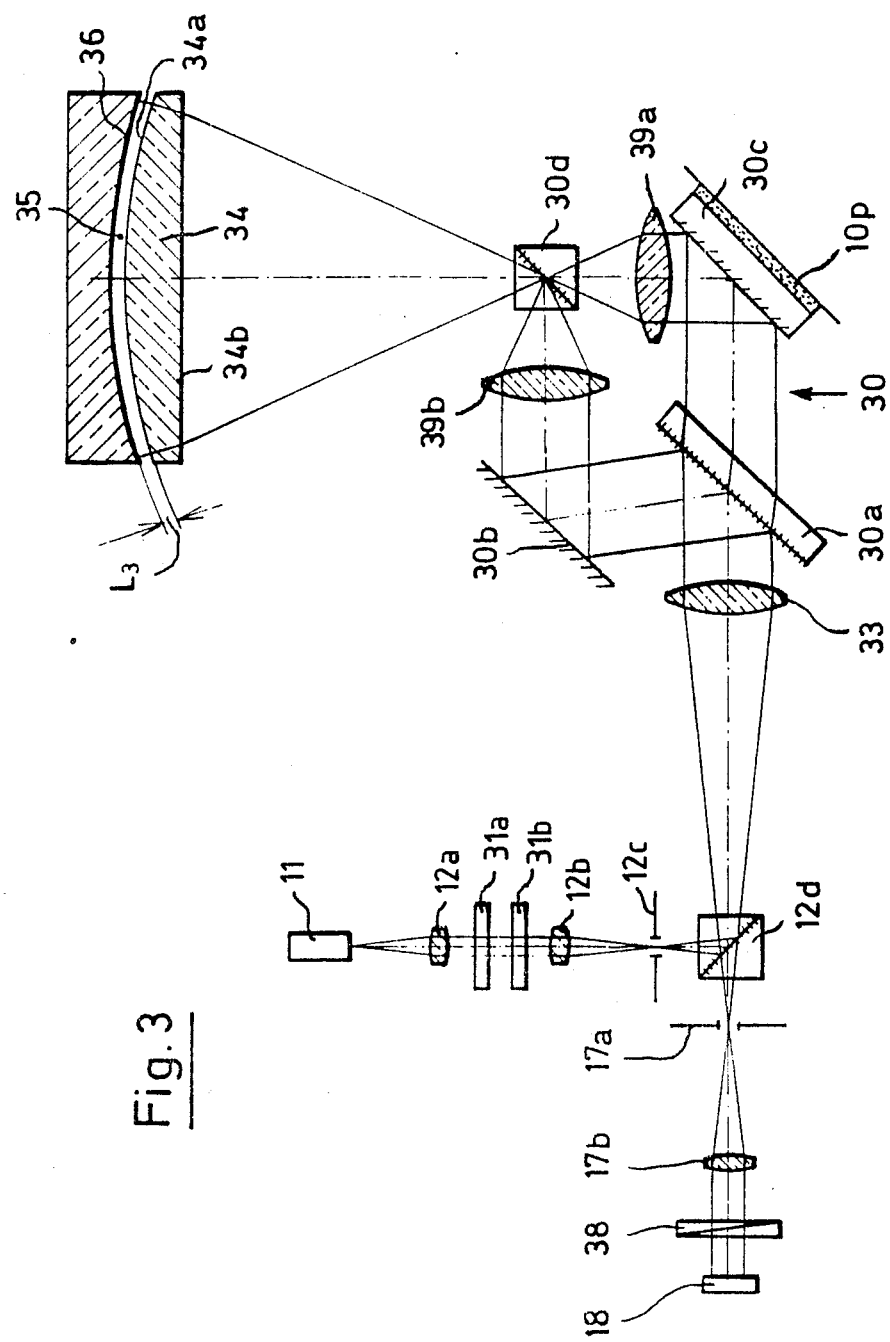
FIG. 3 is an arrangement for testing aspherical surfaces.

FIG. 3 shows a further embodiment wherein an aspherical surface 34a is tested against a spherical reference surface 36 and for which the delay device 30 is not arranged in the illumination portion.

The radiation coming from the light source 11 is collimated at lens 12a and is linearly polarized by means of the polarizer 31a in the event that the light source does not already provide polarized light. Thereafter, the direction of oscillation of the light is so adjusted by means of the halfwave plate 31b that it lies at an angle of 45° to the plane of the drawing. The lens 12b images the light source on the small diaphragm 12c. The light is deflected by the splitter cube 12d to lens 33 which again collimates the beam. In the delay device 30, the beam is split by the polarization beam splitter 30a into a first component beam polarized perpendicularly to the plane of the drawing and which is reflected to the mirror 30b, and into a second component beam which is polarized parallel to the plane of the drawing and which goes to the mirror 30c. These component beams pass through separate lenses (39b and 39a) and are subsequently brought together in a polarization beam splitter 30d. The further configuration corresponds completely to a Fizeau Interferometer with an air gap 35 having the optical path length $nL_3$ between the test surface 34a and the reference surface 36.

For the returning radiation, the polarization beam splitter 30d effects a splitting into the correct component beams within the delay device 30. An analyzer 38 between the lens 17b and the receiver 18 provides that the two temporally coherent waves, which can cause the desired interference to occur, obtain the same polarization state and therefore can interfere.

In this embodiment, the optical path difference of the delay device 30 is given by the difference of the light paths via the mirrors (30b and 30c). This optical path difference can therefore not be shown as a distance in FIG. 3. The polarization beam splitter 30a and the mirror 30b are adjusted such that the optical path difference between, on the one hand, the sum of the optical light paths from the polarization beam splitter 30a via mirror 30b and through the lens 39b up to the splitter surface of the polarization beam splitter 30d, and, on the other hand, the sum of the optical light paths from the polarization beam splitter 30a via mirror 30c and through the lens 39a up to the splitter surface of the polarization beam splitter 30d, correspond to the optical path length $nL_3$ in the air gap 35 between the surfaces (34a and 36). The additional light path after the reflection of the wave on the surface 36 is then compensated on the return of the light in the delay device 30 before the radiation is again united through the polarization optical beam splitter 30a. The defined change of the optical path difference by fractions of a wavelength is again obtained with the piezo element 10p which moves the mirror 30c. Also in this case, the radiation emanating from the light source can again reach the receiver via four different optical paths which however differ in their polarization planes in the delay device 30. For a suitable selection of the coherence length and the remaining conditions, the requirements set forth above for FIG. 1 are again applicable.

The arrangement of the lenses (39a and 39b) within the delay device 30 has the great advantage that the lens 39b acts only together with the test surface 34a, and the lens 39a acts only with the reference surface 36 to create the interference pattern. In this way, it is possible to test the aspherical test surface 34a with the spherical reference surface 36. The lens 39b is so designed that it transforms the entering planar wave into a wave which, after passing through the beam splitter 30d and the entrance surface 34b of the aspherical lens 34, takes on the form of this aspherical surface at the location of the surface 34a. The lens 39a is so designed that it transforms the entering planar wave into a wave, which after passing through the beam splitter 30d and after passing through the entire aspherical lens 34 and the air gap 35, takes on the form of the spherical reference surface 36.

Figure 4:
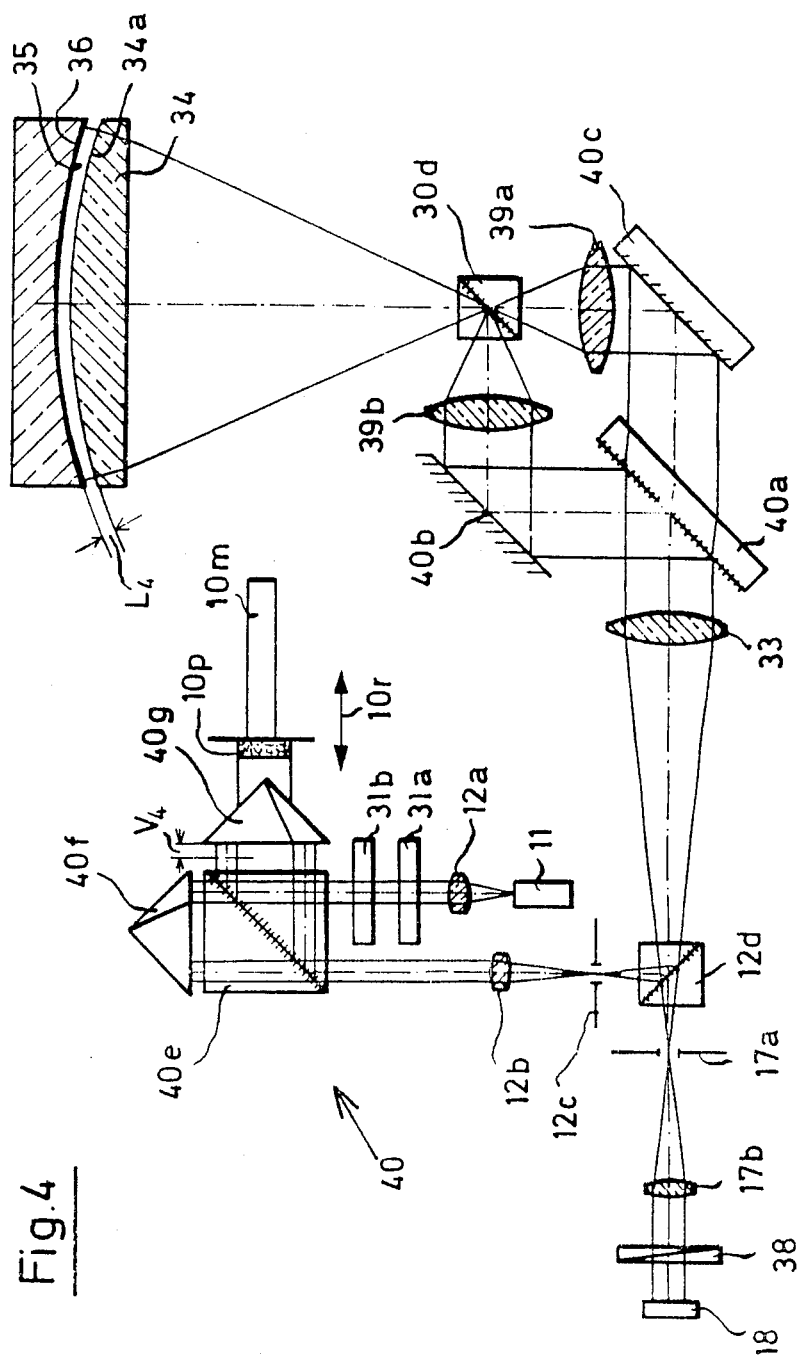
FIG. 4 is a further arrangement for testing aspherical surfaces.

With the example of FIG. 3, it is shown that it can be very advantageous in some situations if the temporally coherent waves reflected by the test surface and the comparison surface additionally differ in their polarization. The delay device 30 satisfies both functions in the arrangement according to FIG. 3, namely the delay of the optical path for compensating for air gap 35 with the possibility of a defined change of the optical path difference by a fraction of a wavelength on the one hand, and "marking" the waves by means of their polarization on the other hand. In FIG. 4, it will be shown that these functions can also be separated.

A further embodiment of an optical delay device 40 is illustrated in FIG. 4, behind the light source 11 and the collimator lens 12a. The delay device 40 comprises a polarization optical beam splitter cube 40e and two triple prisms (or triple mirrors) (40f and 40g). FIG. 4 shows two interferometers arranged one behind the other, namely, the Mach-Zehnder Interferometer made up of components (40a, 40b, 40c, 39a, 39b, 30d) and the Fizeau-Interferometer comprising components (34 and 36). For compensating for the optical path differences which the waves in the two interferometers encounter, the triple prism 40g can be displaced on a guide 10m in the direction 10r by a distance $V_4$. The defined change of the optical path difference by fractions of a wavelength again is provided with the piezo element 10p which moves the triple prism 40g.

The beam emanating from the light source 11 and the lens 12a is first linearly polarized by the polarizer 31a in the event that the light source does not already provide polarized light. Thereafter, the oscillation direction of the light is adjusted by means of the halfwave plate 31b so that it lies at 45° to the plane of the drawing. The polarization optical beam splitter 40e then reflects the component which oscillates perpendicularly to the plane of incidence (plane of the drawing) to the triple prism 40g, and transmits the component which oscillates parallel to the plane of incidence to the triple prism 40f. The recombination after the delay of the component beam having the perpendicular oscillation direction with the other component beam is without loss if the triple prisms do not change the corresponding polarization condition. It is therefore preferable to utilize triple mirrors or to coat the reflecting surfaces of the triple prism with silver layers.

The arrangement and function of the components (12a, 12b, 12c, 12d, 33, 17a, 17b and 18) correspond to that already described in FIGS. 1 and 2. Also here the beam splitter cube 12d is not polarization-active. The component group comprising components (40a, 40b, 40c, 39a, 39b, 30d) which represent a special embodiment of a "polarization-active" Mach-Zehnder Interferometer can be considered a special attachment which permits convex aspherical surfaces to be compared to concave spherical surfaces in a Fizeau arrangement downstream. It is evident that also concave aspherical surfaces can be compared to convex spherical surfaces. A large variety of applications are possible due to this modular configuration. The splitting and recombining of orthogonally polarized (and simultaneously differently delayed) waves in the Mach-Zehnder Interferometer occurs without loss with the components (40a and 30d) before as well as after the reflection of the waves on these surfaces (34a and 36). The transmission axis of the analyzer 38 is adjusted at 45° with respect to the plane of the drawing or can also be adjusted to another angle for different reflectivities of the surfaces (34a and 36). The analyzer 38 is mounted in front of the spatially-resolving receiver 18 and provides that the time-coherent waves receive the same polarization condition and can interfere.

The delay device 40 shown in FIG. 4 can be replaced by means of the delay device 10 shown in FIG. 1 of the polarizer 31a and the halfwave plate 31b are inserted between the lens 12a and the beam splitter 10a and if the splitter layers in the prism 10a are polarizing. Equally as well, the delay device 20 shown in FIG. 2 can be modified to a polarization-optically effective delay device. For this purpose, in addition to components (31a, 31b), two further quarterwave plates are needed which are inserted between the splitter cube 20a and the retroreflecting units (20b, 20c). The splitter cube 20a must then be a polarizing splitter cube. With the aid of these embodiments, it is apparent that further arrangements can be provided with which a simultaneous "marking" of the beams can be obtained by means of the optical light path and the polarization state.

A further possibility should be mentioned as to how the defined change of the optical path difference by fractions of a wavelength can be effected or, which is of the same significance, how the defined change of the optical phase difference of the interfering waves by fractions of 2pi can be effected. Until now, only mechanical displacements of components by means of piezo elements have been described. However, with respect to the embodiments of FIGS. 1 or 4, it is easily possible to insert a rotating halfwave plate into one arm of the delay device 40 with the halfwave plate being disposed between two stationary quarterwave plates. The optical phase difference is then changed by 4pi with a complete rotation of the halfwave plate. In lieu of the foregoing, a stationary and a rotating quarterwave plate can be utilized in one arm in the delay device 20 shown in FIG. 2.

In the following, two further examples are described which show how useful the combination of "marking" of the waves is by means of time delay and polarization.

Similarly to FIG. 2, the first example has as its object to compare the front and back surfaces of a massive plate with respect to each other; however, in this instance, under the assumption that the surfaces enclose a wedge angle.

Figure 5:
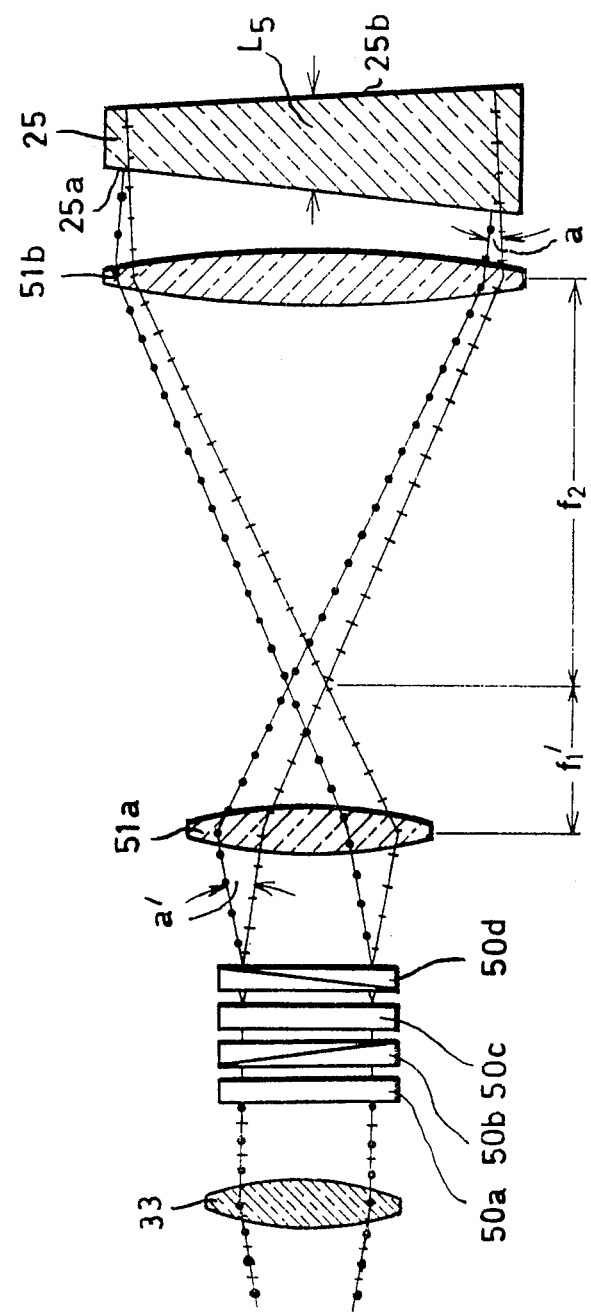
FIG. 5 is an arrangement for testing a wedge-shaped plate.

The arrangement shown in FIG. 5 should be seen as a further "accessory" which can be placed ahead of the lens 33 of the arrangement of FIG. 4 in lieu of the components (40a), etc. This accessory includes both halfwave plates (50a, 50c), the two Wollaston prisms (50b, 50d), the afocal Kepler telescope having the ocular 51a and the objective 51b as well as the test object 25 having the two surfaces (25a, 25b). The optically effective wedge angle (a) of the wedge plate 25 is enlarged by the telescope to the wedge angle $a' = af_2/f_1'$. With the two Wollaston prisms and the two halfwave plates, it is possible to generate two plane waves which enclose the angle (a') and re each linearly polarized with oscillation directions mutually perpendicular.

It is possible to change a' continuously within certain limits $(-a'_{max} \leq a' \leq a'_{max})$ by rotating the components (50a, 50b and 50d). The two orthogonal polarized bundles which enclose angle (a') enter the telescope and enclose the angle (a) after leaving the telescope. The component having the polarization perpendicular to the plane of the drawing of FIG. 5 (before entering the halfwave plate 50a), has already received a delay to $2nV_4$ in the delay device which approximately corresponds to the optical path $2nL_5$. The component corresponding to this component after the Kepler telescope has an oscillation direction which in the general case is no longer perpendicular to the plane of the drawing and impinges perpendicularly on the front surface 25a of the wedge plate 25. The bundle polarized orthogonally hereto must pass through the additional optical path $nL_5$ before it impinges perpendicularly on the back surface 25b of the wedge plate 25 and, after reflection, again passes through the optical path $nL_5$. With this arrangement, the telescope made from the components (51a, 51b) must have a good field correction - which however presents no problem.

The function of the Wollaston prisms (50b, 50d) and the two halfwave plates (50a, 50c) is described below, first for the adjustment for which a'=0 results and then for a finite angle a'≠0.

For a'=0, the optical axes of both halfwave plates (50a, 50c) are adjusted parallel to the polarization directions in the incident component. The edges of the prisms of which both Wollaston prisms are built, are perpendicular to the plane of the drawing of FIG. 5. In this case, the angle introduced by the first Wollaston prism is immediately cancelled again by the second Wollaston prism. Only a small parallel offset of the beam results which is unimportant for the operation of the interferometer. The components (50b, 50c and 50d) are moved together as close as possible in order to hold this parallel offset as small as possible.

The two Wollaston prisms (50b and 50d) are rotated by the same angle in mutually opposite directions about the optical axis for adjusting the finite angle (a'). The halfwave plate 50a is rotated through an angle by an amount corresponding to half the angle of rotation of the Wollaston prism 50b and in the same rotational direction. The halfwave plate 50c remains unchanged. The first halfwave plate rotates the polarization directions of the incident beams parallel to the axes of the Wollaston prism 50b so that no mixing of delayed and non-delayed waves occurs. The second halfwave plate is stationary. By means of the second halfwave plate, the polarization directions are adapted to the Wollaston prism 50d (oscillation direction parallel and perpendicular to the prism edge). In this way, a mixing of delayed and non-delayed waves is again prevented.

The waves returning from the test object after perpendicular reflection on the front and back surfaces pass through the arrangement in the opposite direction and leave the latter in the originally polarization state.

Figure 6:
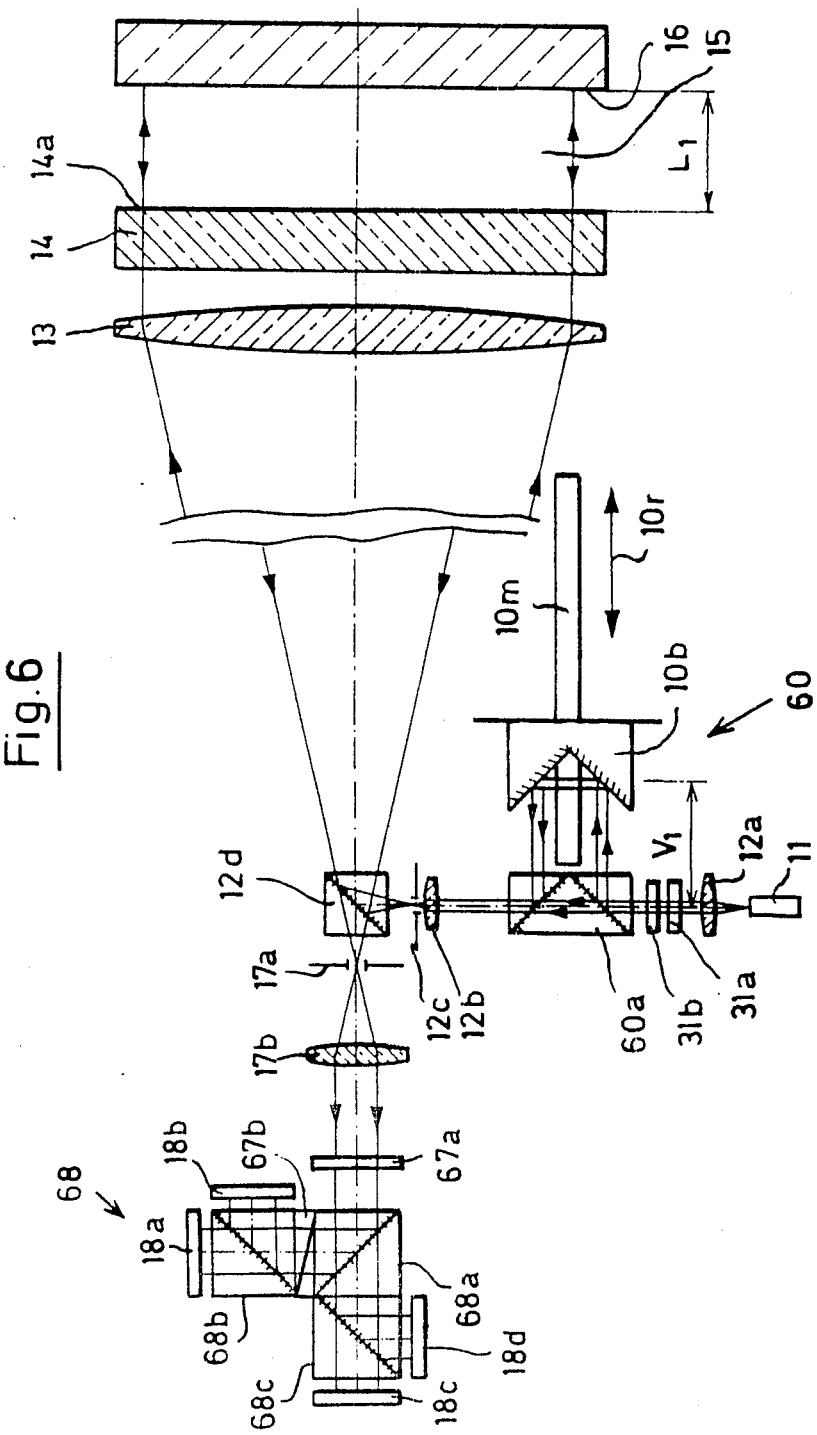
FIG. 6 is a Fizeau arrangement with differently polarized component beams and four spatially-resolving receivers.

In FIG. 6, an embodiment is shown wherein no time change of the relative phase position between comparison wave and test wave occurs; instead, and in lieu thereof, several interferograms are measured simultaneously with several spatially-resolving receivers. These interferograms differ from one another in a defined manner in the relative phase position between comparison wave and test wave. For that purpose, the light in both component arms of the delay device 60 are polarized differently for "marking" the phase. The receiver device 68 utilizes this marking of the test wave and the comparison wave to generate several interferograms (four for example) by means of further polarization-active components. These interferograms differ from one another in a defined manner in the relative phase position between test wave and comparison wave. The function and arrangement of the polarization-optical components is disclosed in U.S. Pat. No. 4,360,271 which is incorporated herein by reference. This patent shows a Michelson Interferometer without spatially-resolving receivers for the purpose of making length measurements. The application for the purpose of interferometric testing with spatially-resolving receivers changes nothing with respect to the modulation and decoding principle. Compared to measuring interferograms in time sequence, the parallel measurement affords the great advantage that the relative phase positions in all measuring channels are changed in the same amount, for example, as a consequence of vibrations and that therefore the phase relationships of the measuring channels are not changed with respect to each other. For this reason, even events which change rapidly with time can be measured.

With the invention, the method of parallel measurement can be applied with interferometers for which a modulation of the phase by means of polarization optical methods in the measuring components of the interferometer is not possible or at least is not advantageous. A typical example is here again presented by the Fizeau Interferometer of FIG. 1 or of FIG. 2. In the embodiment of FIG. 1, a quarterwave plate must, for example, be inserted in the air gap 15 between the surfaces (14a, 16) in order to polarize the test wave and the reference wave differently. This would be wholly unsuitable because such a large quarter waveplate cannot be produced or at least not with the required quality. In the embodiment of FIG. 2, the insertion of such a plate between the surfaces (25a, 25b) is not at all possible.

In FIG. 6, the marking of the test wave and the comparison wave is achieved via different polarization conditions in the delay device 60. The operation of the delay device 60 corresponds substantially to that of the delay device 40 shown in FIG. 4. With respect to the delay device 10 of FIG. 1, the polarizer 31a and the halfwave plate 31b have been added. The splitter layers of the beam splitter 60a act here to polarize. The roof-edge mirror 10b is now no longer mounted on the piezo element. The halfwave plate 31b is adjusted so that the linear polarized light oscillates at 45° to the plane of the drawing. The s-component is delayed in the delay device 60 with respect to the p-component by $2nV_1$. The decoding device comprises the halfway plate 67a by means of which the oscillation directions of the s-component and of the p-component are both conjointly rotated by 45° to the plane of the drawing. The decoding device further includes the non-polarizing beam splitter cube 68a which splits both components and directs the same to the polarizing beam splitter cubes (68b, 68c). In addition, a quaterwave plate 67b is inserted between the beam splitter 68a and the polarizing beam splitter 68b and effects a phase delay between the s-component and the p-component by pi/2. Finally, the polarizing beam splitters effect the production of four interferograms for which the phase position between the equally polarized, interfering components of the test wave and the reference wave each differ by pi/2. These interferograms are simultaneously measured with the synchronized spatially-resolving receivers (18a, 18b, 18c, 18d). As in FIG. 1, the test surface 16 is sharply imaged on the spatially-resolving receivers (18a, 18b, 18c, 18d) by the lenses (13, 17b). The focal lengths of the lenses as well as the object distance and image width must be correspondingly selected. In FIG. 6, the proportions are not tightly maintained so that an overview can be provided.

In the embodiments of FIGS. 1, 2, 4 and 6, the optical delay device is disposed in the "illumination part" of the interferometer. This affords the advantage that the possible different aberrations arising in the component arms of the delay device can be made substantially unharmful by means of the small pinhole diaphragm 12c. Furthermore, the cross sections of the beam can be held especially small. An arrangement of the delay device in the "observing part" of the interferometer however opens up an entirely new possibility for the simultaneous generation of several phase displaced interferograms without having to apply polarization-optical methods for this purpose. The principle is described with reference to FIG. 7. In FIG. 8, an especially advantageous embodiment is illustrated.

Figure 7:
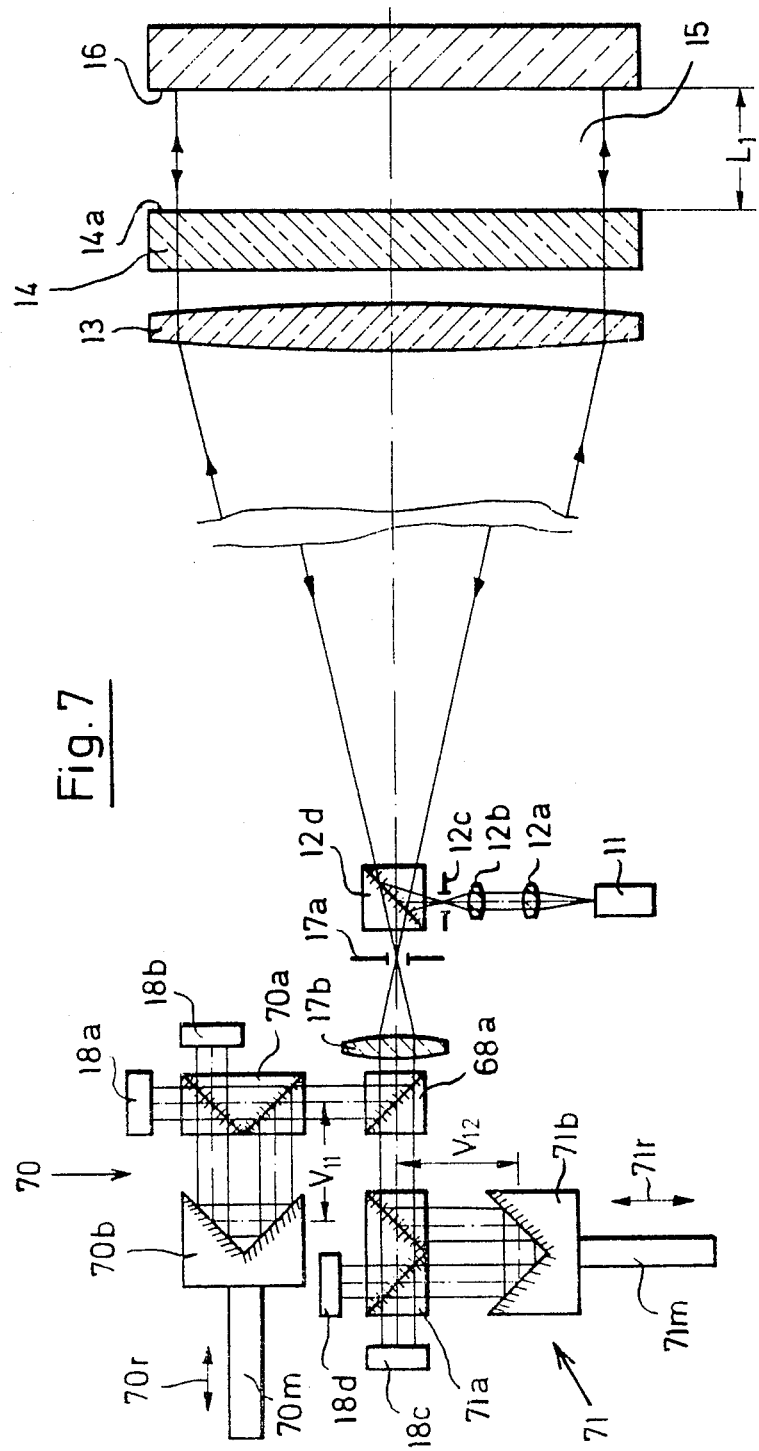
FIG. 7 is a further Fizeau arrangement having four spatially-resolving receivers.
Figure 8:
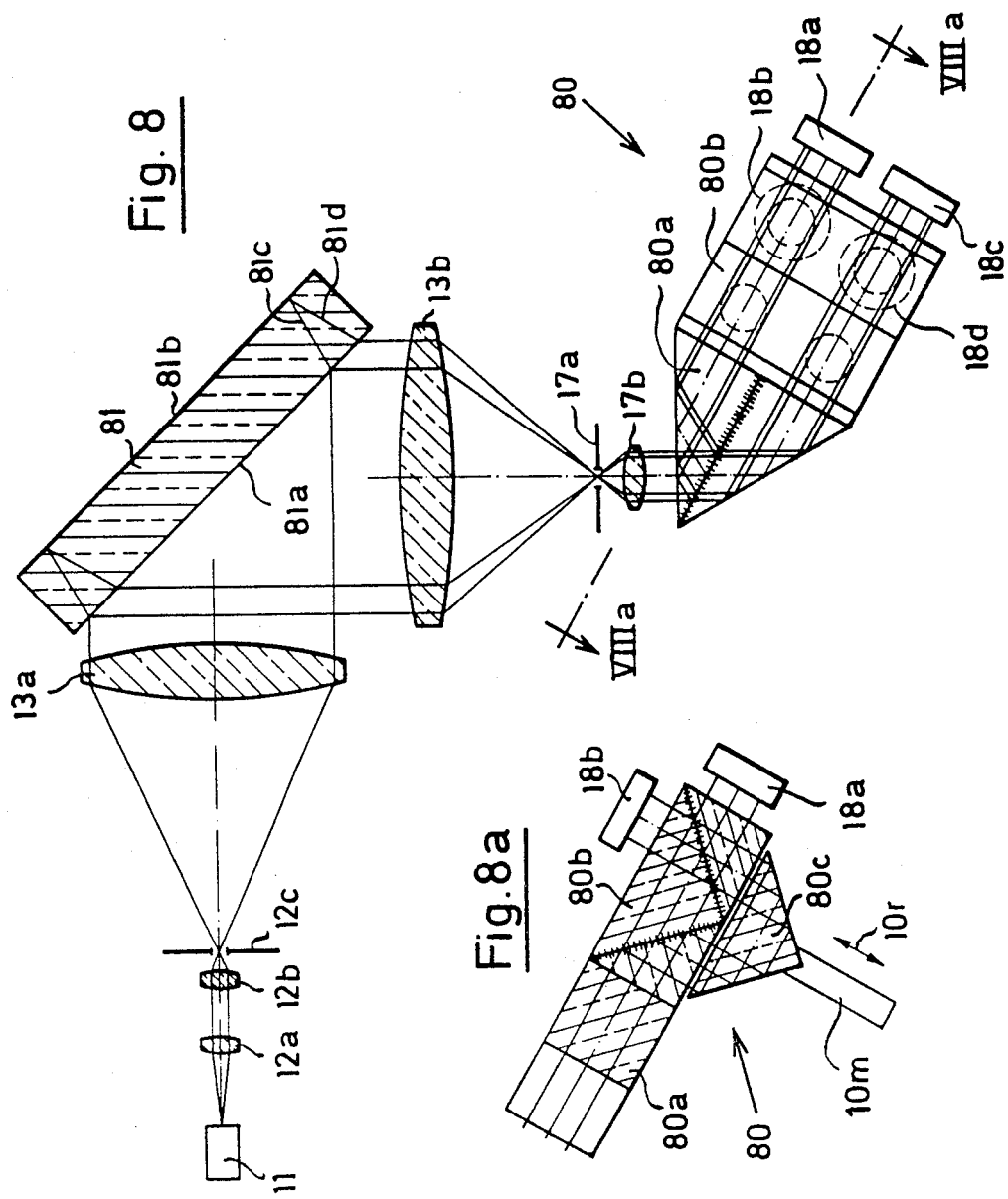

In FIG. 7, a Fizeau Interferometer is again illustrated. The beam splitter 68a splits the partial beams reflected from the surfaces (14a, 16) with different delays. These partial beams are first split into two components which are directed to the prisms (70a, 71a). The component reflected to the prism 70a is first observed. The two partial beams contained in this component, which originate from the reflection at the test surface 16 and the reference surface 14a are temporally incoherent and therefore are at first not capable of interference. The first splitter surface of the prism 70a splits both partial beams contained in the component in a relationship of 1:1. The half reflected at the splitter surface is directed via angle mirror 70b to the second splitter surface of prism 70a and is there united with the other half which in transmission had passed through the first splitter surface of prism 70a. The two united halves now contain a portion which is temporally coherent and therefore capable of interference since the one half of the component beam, which was directed via the angle mirror 70b, passed over an additional optical path $2nV_{11}$ which corresponds approximately to the additional optical path $2nL_1$ in the air gap between the surfaces (14a, 16). The difference of the optical paths between $2nV_{11}$ and $2nL_1$ must be less than the coherent length of the light source. The angle mirror 70b is displaceable along the direction 70r on the guide path 70m for adjusting the delay $V_{11}$ corresponding to the particular distance $L_1$. The two spatially-resolving detectors (18a, 18b) by means of which two interferograms can be simultaneously measured are located behind the second splitter surface of the prism 70a. In these interferograms, the phase differences between test wave and reference wave differ from each other at each point by pi. The phase difference between the interfering coherent portions of the test wave and the reference wave can be continuously and uniformly changed for the entire interferogram by means of a fine adjustment of the distance $V_{11}$ between the prism 70a and the angle mirror 70b.

What was stated above applies in principle to the component transmitted in the splitter cube 68a which reaches the prism 71a and finally leads to two further interferograms which are measured with the spatially-resolving detectors (18c, 18d). A delay $2nV_{12}$ is here adjusted which corresponds approximately to the delay $2nV_{11}$. The phase positions of the interferograms between the detectors (18c, 18d) again differ from each other by an amount pi. The angle mirror 70b is finely displaced on its guide path 70m in order to realize the desired relative phase position of pi/2 between the detectors (18a, 18c). If one assumes exactly the same prisms (70a, 71a), the following would apply for the difference D between the optical distances $nV_{11}$ and $nV_{12}$ for the adjusted condition:

$$D = n|V_{11} - V_{12}| = \frac{(2q + 1)\lambda}{8}$$

wherein q is a small integer number. In this respect, the distance between the splitter cube 68a and the prisms (70a, 71a) have no effect on the relative phase positions of the interferograms.

As in FIG. 1, the test surface 16 should be sharply imaged on the detectors in order to prevent diffraction fringes at the edge of the test object. For this purpose, the focal lengths of the lenses (13, 17b) have to be appropriately selected and the optical paths which result from the object distance and the image distance must be appropriately adjusted. For the purposes of providing an overview in FIG. 7, the object distance and image distance are not presented to scale. The transmission paths through the prisms (70a, 71a) are taken as the optical paths specifying the image distance. The coherent portion of the partial beam reflected at the reference surface 14a passes via the angle mirrors (70b, 71b). The image distance of this partial beam is then too large. For different focal lengths (13 and 17b) it is therefore not possible to image the reference surface 14a sharply on the detector. However, virtually no practical disadvantages result herefrom when the test surface 16 is somewhat smaller than the reference surface 14a so that the Fresnel diffraction fringes at the edge of the image of the reference surface do not extend into the image of the test surface.

In the delay devices (70, 71), two different delays of the partial beam reflected at the reference surface 14a are provided by means of the additional optical paths $2nV_{11}$ and $2nV_{12}$ which are so matched that the desired relative phase positions of the four generated interferograms of 0, pi/2, pi, 3pi/2 result. Generally, every desired even number of interferograms can be generated pursuant to this principle.

The arrangement of two spatially-resolving detectors on both outputs of the second splitter surface of the prisms (70a or 71a) affords two advantages: the available light flux is fully utilized; and, the phase difference of pi between the two interferograms applies exactly and must not first be produced by means of an adjustment. The foregoing notwithstanding, it is principally also possible to utilize only one spatially-resolving detector for each delay unit. For this purpose, half of the light flux is not utilized; however, it is possible to realize every desired phase difference between the measured interferograms. Since at least three interferograms are required for an evaluation, at least three delay units must be provided in this case.

In FIG. 7, the interferograms on the spatially-resolving detectors (18a, 18d) appear as mirror images compared to the interferograms on the spatially-resolving detectors (18b, 18c). This situation is disadvantageous if self-scanning synchronized detectors are used for the measurement and the differences of the signals of the detectors (18a, 18b as well as 18c, 18d) are formed immediately by means of an analog differential amplifier. A like orientation (not reflected) of the interferograms can be obtained when, for example, a mirror is inserted between the prism 70a and the detector 18a as well as between the prism 71a and the detector 18d.

As a further embodiment, a lateral-shear interferometer with the planar parallel shearing plate 81 is illustrated in FIG. 8. This shearing interferometer affords the advantage of providing a relatively simple assembly as well as a simple adjustment and low sensitivity to vibration. The shear distance is known with a high precision and cannot inadvertently be changed if a massive parallel plate is used as a component which effects a splitting of the wave front to be tested into two component wave fronts sheared with respect to each other. The shear distance is a very essential characteristic quantity for the computed evaluation of the interferograms which is performed later.

Shearing interferometers require no reference wave front which remains uninfluenced by the optical system to be tested. Instead, they derive the reference wave front from the test wave front itself. In the lateral-shear interferometer of FIG. 8, the test wave front is reflected on the front surface 81a and on the back surface 81b of the shearing plate 81 and in this way the test wave front is offset as well as being delayed in time. This time delay is essential for the function of the invention and the lateral offset is essential for the function of the shear interferometer. The invention is applicable to all shear interferometers wherein the optical paths of both sheared component waves are either already different or can be made different. This is the case for the vast majority of known arrangements.

With an appropriate careful adjustment of the arrangement, the invention can also be utilized in combination with radiation sources of unusually short coherent length such as obtained from sunlight with a simple color filter reducing the spectral bandwidth to 100 nm. With a centroidal wavelength of for example 500 nm, the coherence length (KL) is then 2500 nm, that is, there is more than an interference fringe period available for phase measurement. The interference fringe period corresponds to an optical path difference of 500 nm. Accordingly, the wave front generated by an astronomical telescope can be measured during the operation thereof with a bright star constituting the light source with a lateral-shear interferometer which operates pursuant to the principle with which the interferometer of FIG. 8 operates. In this case, the entrance pupil of the telescope is imaged on the spatially-resolving receivers (18a, 18b, 18c, 18d) and the bright reference star is imaged in the diaphragm 17a. The measurement of the fast-changing wave front is, for example, necessary to compensate for the "seeing" caused by the atmosphere utilizing an active optical component. Because of the small necessary time constant for the control it is especially important to generate several phase shifted interferograms which can be read out simultaneously.

The principle described with respect to FIG. 7 is applied for the simultaneous detection of four phase-displaced interferograms here, however, in another embodiment. The beam collimated by the lens 17b is now split into two parallel beams with a Kösters prism 80a. This makes it possible to unite the two beam splitters (70a, 71a) of the delay device of FIG. 7 into a single component 80b. The roof-edge mirrors (70b, 71b) of FIG. 7 are now replaced by a single roof-edge prism 80c (see FIG. 8a). One of the waves passes additionally through the sum of the optical paths (81c, 81d) for realizing the lateral shear in the shear plate 81 and the sum of these optical paths (81c, 81d) corresponds to approximately the optical path in the roof-edge prism 80c. It is then preferable to select the optical path in the roof-edge prism 80c to be somewhat smaller than the additional optical path in the shearing plate so that the delay of the delay device can be adjusted by displacing the roof-edge prism 80c on the guide 10m along the direction 10r. The shear plate and the roof-edge prism are advantageously made of the same glass material. A total of four phase shifted interferograms are generated with the delay device 80 described here. With this delay device 80, it is essential that the interferograms on the detectors (18a, 18c) are phase-shifted with respect to each other by a fixed phase angle which is preferably pi/2. The same applies then for the interferograms on the detectors (18b, 18d). In order to reach this objective, a thin layer is vapor-deposited on the one half of the base side of the roof edge prism (the partition line extends perpendicularly to the 90°-edge of the prism). This thin layer then defines an additional optical path of quarter wave for the beam which passes through. The quarter wave corresponds to an eighth wave when the beam enters and another eighth wave when it exits the prism. With the index of refraction being (n) for the layer, then the following equation applies for the layer thickness: $d = \lambda/[8(n-1)]$. The index of refraction (n) is then so selected that it is possible to subsequently vapor-deposit reflection-reducing layers onto the entire base side of the roof-edge prism. The simplest circumstances are obtained when the index of refraction of the layer and of the prism material differ from each other as little as possible.

In several applications, it is possible to start with a fixed predetermined delay of the waves in the measuring part of the interferometer. For reasons of the stability of the adjustment, it is then preferable to tightly glue the prism 80c to the beam splitter 80b. In this case, the optical path difference of $\lambda/4$ can be obtained for both halves of the prism in that, for example, an appropriate layer is vapor-deposit onto half of one of the short faces.

Figure 9:
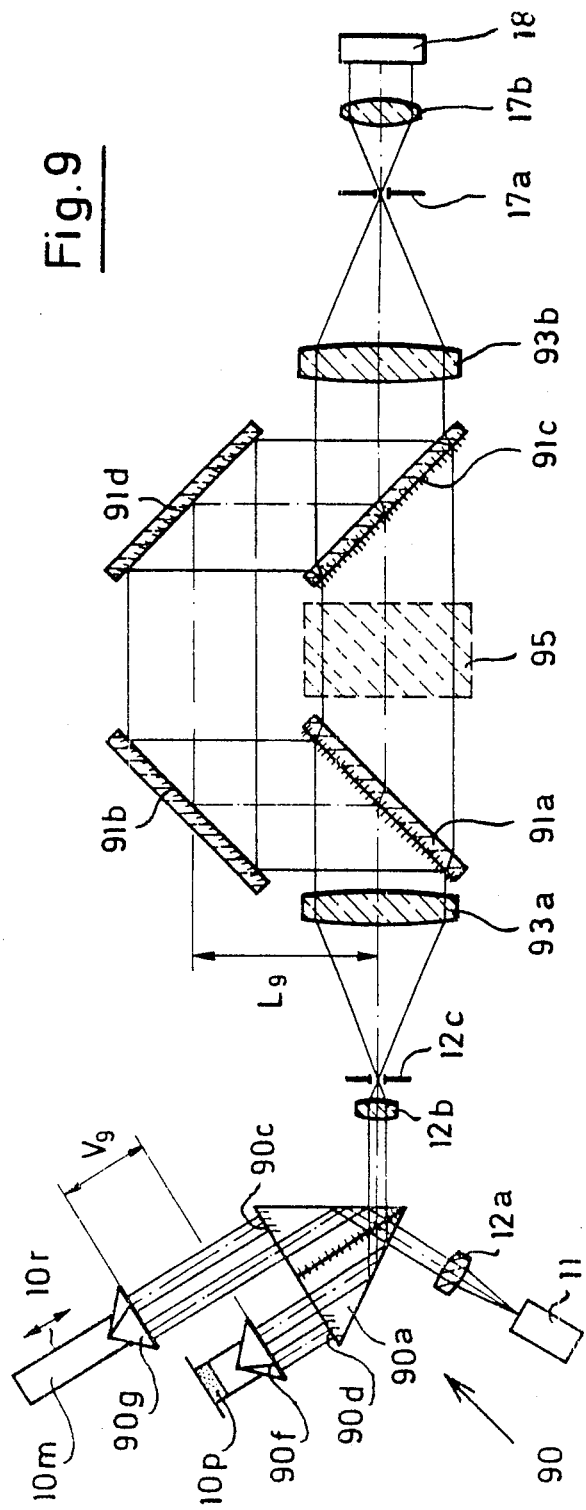

A still further embodiment of the invention is shown in FIG. 9 wherein the invention is applied to a Mach-Zehnder Interferometer. This type of interferometer is often used for investigating boundary layers, flow and convection processes, temperature distributions and the like in transparent gases or liquids. For this purpose, large beam cross sections or a large "test volume" 95 is needed. In the known way of applying the phase measuring technology, the optical path length (and therefore the phase) for example of the reference arm of the interferometer is changed in a defined manner in that, for example, the large mirror 91b is displaced mechanically or piezo-electrically by a fraction of a wavelength. However, this application fails here because of the size of the mirror.

In FIG. 9, the delay device 90 is mounted between the light source 11 and the pinhole diaphragm 12c. The coherence length of the light source is again less than the optical light path $2nL_9$ which is additionally passed through by the second component wave in the reference arm of the Mach-Zehnder Interferometer. The interference capability between the component waves is again established by means of the optical delay device 90. The optical delay device 90 here comprises the Kösters prism 90a, the two triple prisms (90f, 90g) as well as the surface mirrors (90c, 90d) which are vapor deposited onto the exit surface of the Kösters prism. In this delay device, tilting as well as lateral displacement of the triple prisms have no harmful effect. The triple prism 90g is adjustable on a guide path 10m in the direction 10r for adjusting the coherence. The triple prism 90f is mounted on a piezo element 10p for providing defined changes of the phase position of the component waves. The triple prism 90g is displaced on the guide path 10m in the direction 10r by an amount $V_9 \approx L_9/2$ for compensating for the additional optical path $2nL_9$ of the second component wave in the Mach-Zehnder Interferometer. A precondition for the foregoing is that the medium in the test volume 95 has approximately an index of refraction of $n=1$. If this is not the case, compensation can be achieved by inserting a corresponding "reference volume" into the reference arm of the Mach-Zehnder Interferometer between the mirrors (91b and 91d). The reference volume is then filled with a medium having the same index of refraction.

The beams which are time delayed differently are again united by the Kösters prism 90a and expanded with the lenses (12b, 93a). The small diaphragm 12c lying between the lenses (12b, 93a) serves to clean the beams. The beam now enters the Mach-Zehnder Interferometer consisting of the two beam splitters (91a, 91c) and the two mirrors (91b, 91d). The test volume 95 is imaged on the spatially-resolving detector 18 on which the interferences arise, by means of the lenses (93b, 17b). The diaphragm 17a eliminates possible disturbing interferences which can originate on the rearward side of the beam splitter plates which are slightly wedge-shaped.

It is understood that the foregoing description is that of the preferred embodiments of the invention and that various changes and modifications may be made thereto without departing from the spirit and scope of the invention as defined in the appended claims.

What is claimed is:

1. An interferometer for measuring optical phase differences which occur between two partial beams reflected from a reference surface and from the surface of the part to be measured, respectively, the interferometer comprising:
   light source means for providing a coherent beam directed along a beam path;
   optical delay means for splitting said beam into first and second component beams and for generating a first optical path difference between said first and second component beams and for then congruently recombining said component beams;
   optical directing means for directing said first and second component beams toward the reference surface and the measurement surface of the part to be measured whereat said partial beams occur and a second optical path difference is generated between said partial beams;
   said optical delay means including adjusting means for adjusting said first optical path difference to be approximately equal to said second optical path difference;
   said light source means having a coherence length that is less than said second optical path difference;
   spatially-resolving receiver means; and,
   optical means for transmitting said partial beams reflected from said reference surface and said measurement surface, respectively, so as to image said reference surface and said measurement surface on said receiver means.

2. The interferometer of claim 1, said adjusting means including fine adjust means for reproducibly changing said first optical path difference by fractions of the wavelength of said light source means.

3. The interferometer of claim 1, said spatially-resolving receiver means including a plurality of spatially-resolving receivers for simultaneously measuring a plurality of interferograms having different phase positions; and, said interferometer further comprising: polarization-optical means for imparting respectively different polarizations to said component beams.

4. The interferometer of claim 1, said spatially-resolving receiver means including a plurality of spatially-resolving receivers for simultaneously measuring a plurality of interferograms having different phase positions; and, said optical delay means including at least two optical devices which are adjusted to have fixed phase differences with respect to each other.

5. The interferometer of claim 1, said spatially-resolving receiver means including a plurality of spatially-resolving receivers for simultaneously measuring a plurality of interferograms having different phase positions; said optical delay means including: at least two optical delay devices; and, means for adjusting said optical delay devices to fixed phase differences with respect to each other.

6. The interferometer of claim 1, said spatially-resolving receiver means including a plurality of spatially-resolving receivers for simultaneously measuring a plurality of interferograms having different phase positions; said optical delay means including: less than three optical delay devices which are adjusted to have fixed phase differences with respect to each other; and, said interferometer further comprising means for generating beam paths with additional phase differences.

7. The interferometer of claim 1, said spatially-resolving receiver means including a plurality of spatially-resolving receivers for simultaneously measuring a plurality of interferograms having different phase positions; said optical delay means including: less than three optical delay devices; and, means for adjusting said optical delay devices to fixed phase differences with respect to each other; and, said interferometer further comprising means for generating beam paths with additional phase differences.

8. The interferometer of claim 1, comprising polarization-optical means for obtaining a spatial or angular separation of the partial beams occurring in said measuring part.

9. The interferometer of claim 1, said light source means being a spectrum lamp.

10. The interferometer of claim 9, said spectrum lamp having a coherence length of approximately 2 mm.

11. The interferometer of claim 1, said light source means being a laser.

12. The interferometer of claim 1, said spectrum lamp having a coherence length of approximately 2 mm.

13. The interferometer of claim 1, said light source means comprising: a continuous light source; and, a narrow band interference filter.

14. The interferometer of claim 13, said continuous light source being a halogen lamp and said filter having a spectral half-value width of 0.5 nm.

15. The interferometer of claim 13, said continuous light source having a coherence length of approximately 2 mm.

16. The interferometer of claim 1, said light source being a star.

* * * * *

UNITED STATES PATENT AND TRADEMARK OFFICE
CERTIFICATE OF CORRECTION

PATENT NO. : 4,872,755

DATED : October 10, 1989

INVENTOR(S) : Michael Küchel

It is certified that error appears in the above-identified patent and that said Letters Patent is hereby corrected as shown below:

In the Abstract, line 6: delete "path" and substitute -- part -- therefor.

In the Abstract, line 12: delete "path" and substitute -- part -- therefor.

In column 2, line 16: delete "polarize" and substitute -- polarized -- therefor.

In column 4, line 14: delete "$2nV_l$" and substitute -- $2nV_1$ -- therefor.

In column 4, line 25: delete "2nL" and substitute -- $2nL_1$ -- therefor.

In column 6, line 5: delete "temporally coherent" and substitute -- temporally-coherent -- therefor.

In column 6, line 54: delete "temporally" and substitute -- temporally- -- therefor.

In column 7, line 22: delete "prism 40g," and substitute -- prism 40g -- therefor.

In column 7, line 38: insert -- as -- between "considered" and "a".

UNITED STATES PATENT AND TRADEMARK OFFICE
CERTIFICATE OF CORRECTION

PATENT NO. : 4,872,755

DATED : October 10, 1989

INVENTOR(S) : Michael Küchel

It is certified that error appears in the above-identified patent and that said Letters Patent is hereby corrected as shown below:

In column 7, line 54: delete "time-coher-" and substitute -- temporally-coher- -- therefor.

In column 7, line 58: delete "of", second occurrence, and substitute -- if -- therefor.

In column 8, line 42: delete "re" and substitute -- are -- therefor.

In column 9, line 35: delete "originally" and substitute -- original -- therefor.

In column 11, line 60: delete "distance" and substitute -- distances -- therefor.

In column 13, line 34: insert a comma after "control".

UNITED STATES PATENT AND TRADEMARK OFFICE
CERTIFICATE OF CORRECTION

PATENT NO. : 4,872,755

DATED : October 10, 1989

INVENTOR(S) : Michael Küchel

It is certified that error appears in the above-identified patent and that said Letters Patent is hereby corrected as shown below:

In column 13, line 58: delete "phase shifted" and substitute -- phase-shifted -- therefor.

In column 14, line 1: insert -- a -- before "quarter".

In column 14, line 20: delete "vapor-deposit" and substitute -- vapor-deposited -- therefor.

In column 14, line 46: delete "vapor" and substitute -- vapor- -- therefor.

Signed and Sealed this

Sixteenth Day of October, 1990

Attest:

HARRY F. MANBECK, JR.

*Attesting Officer*   *Commissioner of Patents and Trademarks*